United States Patent [19]
Then

[11] Patent Number: 5,320,330
[45] Date of Patent: Jun. 14, 1994

[54] GAS TIGHT LANCE CLOSURE AT A COOLING CHIMNEY HOOD FOR STEEL CONVERTORS

[75] Inventor: Peter Then, Essen, Fed. Rep. of Germany

[73] Assignee: Mannesmann Aktiengesellschaft, Dusseldorf, Fed. Rep. of Germany

[21] Appl. No.: 40,533

[22] Filed: Mar. 30, 1993

[30] Foreign Application Priority Data

Mar. 30, 1992 [DE] Fed. Rep. of Germany ....... 4210915

[51] Int. Cl.$^5$ .............................................. C21C 5/46
[52] U.S. Cl. ................................... 266/158; 266/271; 266/226
[58] Field of Search ................. 266/271, 225, 226, 158

[56] References Cited

U.S. PATENT DOCUMENTS

| | | | |
|---|---|---|---|
| 4,253,644 | 3/1981 | Marshall et al. | 266/158 |
| 4,648,584 | 3/1987 | Wamser | 266/158 |
| 4,720,837 | 1/1988 | Kanada | 266/158 |

*Primary Examiner*—Scott Kastler
*Attorney, Agent, or Firm*—Cohen, Pontani Lieberman, Pavane

[57] ABSTRACT

The invention is directed to a gas tight lance closing device at a cooling chimney hood for steel converters. An opening is provided in the cooling chimney for a jetting lance, which latter can be raised and lowered. The diameter of the opening is dimensioned in such a way that an annular gap remains between the inner edge of the opening and the outer circumference of the jetting lance. In order to close the chimney opening toward the lance so as to be gas tight and to enable operation at an internal overpressure of more than 0.1 bar and against a correspondingly large negative pressure without letting gas escape or letting in air, it is preferred that a base plate be securely installed at the chimney opening, that an identically shaped cover plate which can press against the base plate be fastened at the lance so as to be movable and sealed relative to the lance body by stuffing box packing, and that the cover plate have sealing rings on its underside and can be placed on the base plate and lifted from the latter by a driving device arranged at the jetting lance.

12 Claims, 1 Drawing Sheet

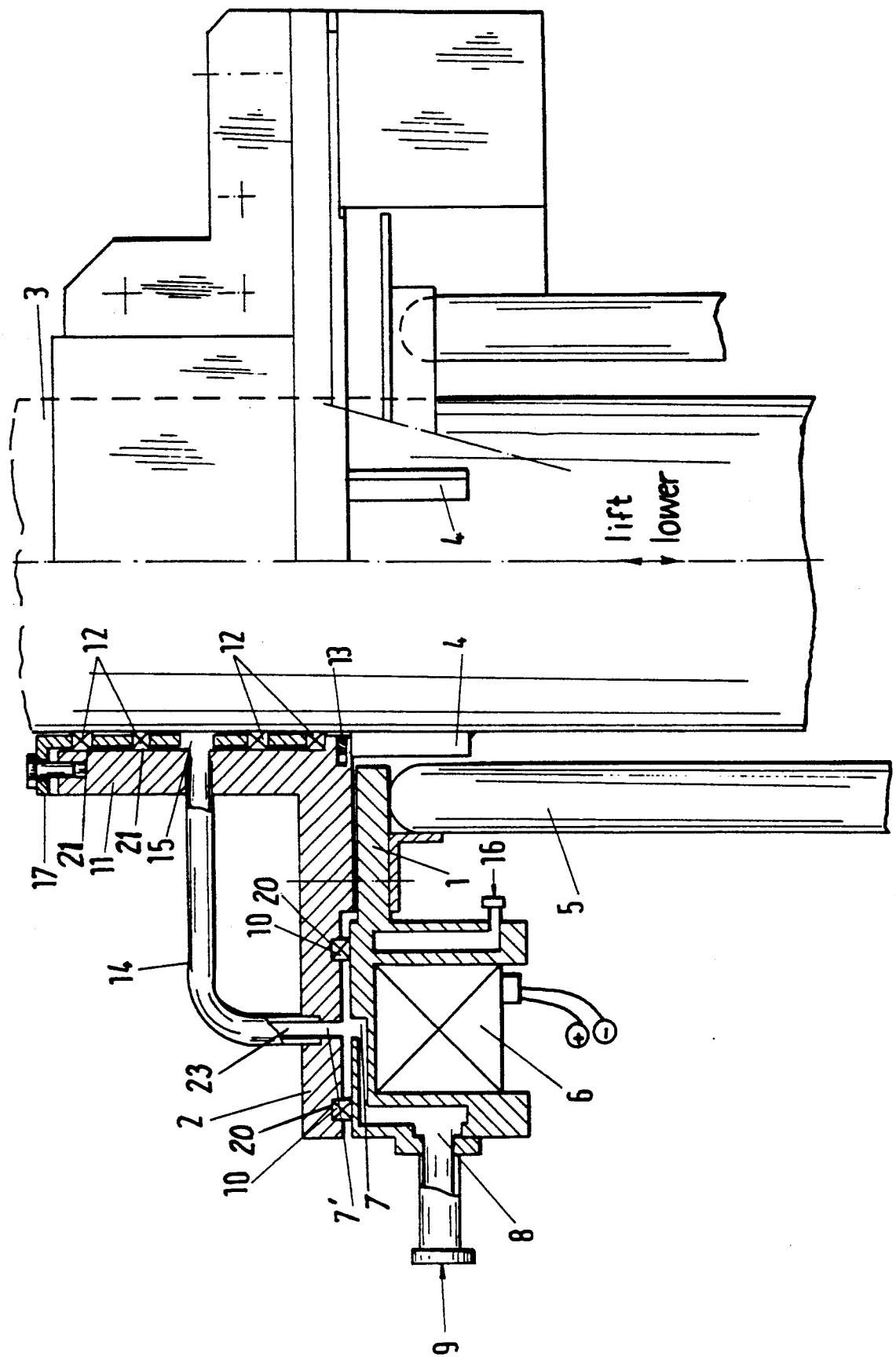

GAS TIGHT LANCE CLOSURE AT A COOLING CHIMNEY HOOD FOR STEEL CONVERTORS

FIELD OF THE INVENTION

The invention is directed to a gas tight lance closing device on a cooling chimney hood for steel converters.

BACKGROUND OF THE INVENTION

An opening is provided in the cooling chimney connected to a mouth of a steel converter for a jetting lance, through which the lance can be lowered into the converter. This opening must be substantially larger than the diameter of the lance in order to remove possible caking formed on the lance caused by slag when the lance is raised through the opening so to have no mechanical contact therewith. Movable mechanical dosing means are conventionally arranged at the chimney opening for narrowing the gap between the chimney opening and the tubular outer surface area of the lance as far as possible, but without hindering the vertical movability of the lance, and for limiting the escape of hot dust-confining converter gases. Covers are also often arranged at the lance which lie on the chimney opening when lowered so as to close it. It is also conventional to provide a further impediment to the escape of gas in that blocking media such as stem or nitrogen are injected at high pressure at the chimney opening by means of nozzles in an annular arrangement.

The known lance barriers mentioned above are not gas tight, and therefore, let gas escape even as a result of slight internal overpressure or external air can penetrate into the system due to internal negative pressure in the system.

SUMMARY OF THE INVENTION

The object of the device described in the following is to close the chimney opening toward the lance so as to be gas tight and to enable operation at an internal overpressure of more than 0.1 bar or also against a correspondingly large negative pressure without allowing gas to escape or air to enter.

Other objects and features of the present invention will become apparent from the following detailed description considered in conjunction with trio accompanying drawing. It is to be understood, however, that the drawing is designed solely for the purposes of illustration and not as a definition of the limits of the invention, for which reference should be made to the appended claims.

BRIEF DESCRIPTION OF THE DRAWING

The invention will be explained with reference to the drawing which shows a partial section through the lance closure.

DESCRIPTION OF THE PREFERRED EMBODIMENTS

The gas tight closing device includes a base plate 1 which is securely connected with the chimney opening 5. The base plate 1 has a correspondingly large opening and a loosely contacting, movable cover plate 2 which encloses the lance body 3. This cover plate 2 completely covers the opening in the base plate and seals it relative to the latter. The cover plate 2 can be lowered onto the base plate 1 by driving devices 4. The driving devices 4 are arranged at the lance 3 when descending into a converter (not shown) and can be raised again along with the lance when the latter is raised. The driving devices 4 can be arranged in such a way that the cover plate 2 is lowered onto the base plate at an optional lance height and raised again by the latter so as to guide the seal between the lance body 3 and cover plate 2 in the cleanest possible area of the lance.

The base plate 1 is provided with an annular electromagnet 6 which is energized after the cover plate 2 is lowered. The electromagnetic force of the energized electromagnet 6 presses the cover plate 2 securely against the base plate 1 by means of magnetic forces. The strength of the electromagnet is selected in such a way that the attractive force produces the counter forces generated by the internal overpressure as well as the contact pressure, such as, bearing pressure and pressing pressure required for sealing.

The surface of the base plate 1 is constructed so as to be either plane or conically sloped in order to prevent the depositing of slag and/or dust as far as possible or so that the latter may be easily removed by suitable measures.

Circularly arranged bore holes 7, which are connected with a distributor chamber 8, are arranged in the surface of the base plate 1. The distributor chamber 8 has a connection for a blocking medium which is injected into the distributor chamber 8 under pressure and exits again at the surface through the described bore holes 7.

The underside of the cover plate 2 has the same shape as the base plate so as to be adapted to it in an exact manner. In addition, two or more concentric grooves 20 are cut into the underside of the cover plate 2. Annular seals 10 having a special sealing material are inserted into these grooves and lie on the base plate when the cover plate is lowered. The seals 10 are dimensioned in such a way that a hollow space is formed between the packing or sealing rings, but the attractive force of the electromagnet on the cover plate is not diminished.

The cover plate 2 is defined toward the lance body by a cylindrical bushing 11 which is advanced as close as possible to the latter without hindering the lance from moving in a vertical sliding motion inside the bushing. Annular recesses or depressions 21 are cut into the inside of the bushing 11, sealing rings being inserted in these depressions as packing 12 in such a way that they are pressed against the lance body and seal the latter relative to the bushing. The height of the bushing and the number of packing rings are selected according to the prevailing internal pressure against which sealing is to be effected.

One or more scraping or stripping rings 13 are inserted below the packing rings in grooves so as to be movable in order to strip away possibly adhering particles from the lance body while the latter slides upward through the bushing and before the cover plate is raised again.

The space between the sealing rings arranged at the underside of the cover plate is situated in such a way that the bore holes 7 in the base plate 1 open into it. The same arrangement of bore holes 7 is found in the cover plate 2 and opens into a collecting duct 23 arranged on the upper side of same. Connecting ducts 14 lead from the collecting duct 23 to the bushing 11 at the lance body and end at bore holes 15 in the bushing, which bore holes terminate between the packing rings. If a blocking medium is injected into the distributor duct at the base plate with a sufficiently high pressure, the blocking medium will first exit from the bore holes 7 at the surface. When the lance is lowered into the opening, the blocking medium is deflected to the side at the approaching cover plate and blasts the smooth surface free of particles.

As soon as the cover plate 2 has been lowered, the electromagnet 6 is energized. The resulting magnetic force presses the cover plate 2 with the sealing 10 securely against the base plate. The blocking medium exiting at the base plate can no longer escape. It is pressed into the intermediate space of the seals at the cover plate and is guided further through the bore holes 7 located in the latter and through the collecting duct 23 to the bushing 11 where it serves as blocking medium between the packing 12 and produces an overpressure before it can escape as a result of gap losses.

The blocking pressure which is thus produced at the sealing surface between the cover plate 2 and the base plate 1 as well as in the packing of the bushing effectively prevents gas from escaping from the cooling chimney opening.

The construction of the closure allows the free movement of the lance 3 in the vertical direction in spite of the seal. When the base plate 1 is constructed so as to be plane, the cover plate 2 can yield to lateral pressure due to movements of the lance 3 in spite of the contact pressure caused by the electromagnets 6 and can accordingly protect the lance 3 against excessive lateral deformation shearing.

Contact pressure can also be produced mechanically rather than by electromagnets. For this purpose, a plurality of contact pressure members, e.g. hydraulic cylinders 16, can be fastened laterally at the base plate 1 and supported so as to be rotatable around its axis. As soon as the cover plate 2 has been lowered, the contact pressure members are swiveled so that they are located over the cover plate. The contact pressure device is accordingly activated and presses the cover plate down on the base plate with a ram or piston. Before the lance moves out, the contact pressure device is first disengaged again and swiveled away to free the cover plate.

Cooling means are installed at the closing device to guide off heat from the hot gas and heat generated by the electromagnet. If necessary, the packing seals of the bushing can also be provided with lubricating possibilities.

The cover plate is partitioned and the two halves are screwed together to facilitate installation and dismantling. A contact pressure collar is arranged on the bushing. The packing can be inserted through this contact pressure collar and the latter can press against them.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, however, therefore, to be limited only as indicated by the scope of the claims appended hereto.

What is claimed is:

1. A gas tight lance closing apparatus arranged at a cooling chimney hood for a steel convertor, said closing apparatus for closing an opening provided in the cooling chimney hood for accommodating a jetting lance, the jetting lance being moveable between a raised position and a lowered position, the diameter of the opening having a size such that an annular gap exists between an inner edge of the opening and an outer circumference of the jetting lance, said gas tight lance closing apparatus comprising:

a base plate mounted at the opening of the cooling chimney hood;

a cover plate opposite said base plate and comprising a sealing medium and at least one sealing ring disposed at a first surface of said cover plate, said cover plate being fastened to and movable relative with the jetting lance, said sealing medium being provided for sealing said cover plate with the jetting lance at the annular gap;

driving means for moving the cover plate between the raised position and a lowered position;

an electromagnet at said base plate for holding said cover plate against said base plate when said cover plate is moved to said lowered position by said driving means; said first surface of said cover plate being in abutment with a first surface of said base plate when said driving means moves the cover plate to said lowered position.

2. An apparatus according to claim 1, wherein the sealing medium comprises stuffing box packing.

3. An apparatus according to claim 1, wherein the first surface of said cover plate has the same shape as said first surface of said base plate.

4. A gas tight lance closing apparatus according to claim 1, wherein said electromagnet has an annular shape.

5. A gas tight lance closing apparatus according to claim 1, wherein said cover plate is mechanically pressed against said base plate.

6. A gas tight lance closing apparatus according to claim 1, further comprising a bushing disposed at said cover plate for enclosing the jetting lance.

7. An apparatus according to claim 6, further comprising connection means for introducing a blocking medium, wherein said base plate comprises a first bore hole in communication with said connection means, wherein said cover plate comprises a second bore hole arranged in confronting opposition to and in communication with said first bore hole, said second bore hole being in communication with said connection means, wherein said first surface of said cover plate and said bushing comprises a least one packing ring, and wherein when the blocking medium is introduced by said connection means, the blocking medium is introduced into said first and second bore holes such that the blocking medium seals any gaps between (1) said base plate and said cover plate and (2) said bushing and the jetting lance.

8. A gas tight lance closing apparatus according to claim 7, further comprising a stripping device arranged in said bushing in front of said packing rings between a free end of of the jetting lance and said cover plate.

9. A gas tight lance closing apparatus according to one of claim 1, wherein said cover plate is partitioned.

10. A gas tight lance closing apparatus for a steel convertor, comprising:

a jetting lance;

a cooling chimney hood (5) having an opening therein for accommodating said jetting lance, said opening having a diameter such that an annular gap exists between an inner edge of the opening and an outer circumference of said jetting lance, so that said lance can be moved between a raised position and a lowered position;

a base plate (1) mounted on said opening of said cooling chimney hood;

a cover plate having a lower surface and being fastened to said lance for sliding movement relative thereto;

mean for pressing said cover plate against said base plate;

sealing means comprising stuffing box packings for sealing said cover plate relative to said lance;

at least one sealing ring disposed at said lower surface of said cover plate; and means mounted at said lance for placing said cover plate on said base plate and for lifting said cover plate away from said base plate.

11. The gas tight lance closing device according to claim 10, wherein said means for pressing said cover plate against said base plate comprises an electromagnet.

12. The gas tight lance closing device according to claim 11, wherein said electromagnet is of annular construction.

* * * * *